US010402837B2

(12) United States Patent
Eswaran et al.

(10) Patent No.: US 10,402,837 B2
(45) Date of Patent: Sep. 3, 2019

(54) METHOD AND SYSTEM FOR PREDICTING BEHAVIORAL CHARACTERISTICS OF CUSTOMERS IN PHYSICAL STORES

(71) Applicants: Conduent Business Services, LLC, Dallas, TX (US); Singapore Management University, Singapore (SG)

(72) Inventors: Sharanya Eswaran, Bangalore (IN); Deepthi Chander, Cochin (IN); Meeralakshmi Radhakrishnan, Kottayam (IN); Archan Misra, Singapore (SG); Koustuv Dasgupta, Bangalore (IN)

(73) Assignee: Conduent Busness System, LLC, Florham Park, NJ (US)

( * ) Notice: Subject to any disclaimer, the term of this patent is extended or adjusted under 35 U.S.C. 154(b) by 303 days.

(21) Appl. No.: 15/335,495

(22) Filed: Oct. 27, 2016

(65) Prior Publication Data

US 2018/0121939 A1 May 3, 2018

(51) Int. Cl.
*G06Q 30/02* (2012.01)

(52) U.S. Cl.
CPC ..... *G06Q 30/0202* (2013.01); *G06Q 30/0201* (2013.01); *G06Q 30/0203* (2013.01); *G06Q 30/0204* (2013.01)

(58) Field of Classification Search
CPC ........... G06Q 30/0201; G06Q 30/0202; G06Q 30/0203; G06Q 30/0204
See application file for complete search history.

(56) References Cited

U.S. PATENT DOCUMENTS 8,412,656 B1 * 4/2013 Baboo ................ G06Q 30/0201 706/20
10,096,054 B2 * 10/2018 Benson .................. G06Q 10/00
2004/0111454 A1 * 6/2004 Sorensen ............... G06Q 30/02 708/200

(Continued)

OTHER PUBLICATIONS

Chen, Yu. Rensselaer Polytechnic Institute, ProQuest Dissertations Publishing, 2015. 3726999. (Year: 2015).*

*Primary Examiner* — Ivan R Goldberg
*Assistant Examiner* — Nicholas D Bolen
(74) *Attorney, Agent, or Firm* — Jones Robb, PLLC

(57) ABSTRACT

The disclosed embodiments illustrate methods and systems for processing customer data to predict behavioral characteristics of a customer in a physical store. The method includes receiving customer data, pertaining to a shopping episode, of the customer from one or more sensing devices. The method further includes segmenting the shopping episode into one or more segments of time durations. The method further includes categorizing each of the one or more segments of time durations into one of an in-aisle category and a non-aisle category. The method further includes identifying hand-related actions of the customer based on the received customer data. The method further includes determining a likelihood of occurrence of an action-related category based on at least the identified one or more hand-related actions. The method further includes predicting the behavioral characteristics of the customer based on at least the determined likelihood of occurrence of the action-related category.

29 Claims, 6 Drawing Sheets

500
102
102
202
PROCESSOR
502
ITEM- LEVEL CLASSIFIER
NON-AISLE CATEGORY
502A
502B
IN-AISLE CATEGORY
FIRST CATEGORY
SECOND CATEGORY
THIRD CATEGORY
502B1
502B2
502B3
506
E1 E2 ---- EN
504
EPISODE-LEVEL CLASSIFIER
HURRIED
FAMILIER
CROWDED
504A
LONGITUDINAL-LEVEL CLASSIFIER
508
CUSTOMER BEHAVIORAL CHARACTERISTICS
510

(56) References Cited

U.S. PATENT DOCUMENTS

| | | | | |
|---|---|---|---|---|
| 2007/0067203 | A1* | 3/2007 | Gil | G06Q 10/087 705/7.32 |
| 2008/0021767 | A1* | 1/2008 | Benson | G06Q 10/00 705/7.29 |
| 2008/0306756 | A1* | 12/2008 | Sorensen | G06Q 30/02 705/27.1 |
| 2009/0083122 | A1* | 3/2009 | Angell | G06Q 10/0631 705/7.33 |
| 2009/0240556 | A1* | 9/2009 | Angell | G06Q 30/02 705/7.29 |
| 2010/0063870 | A1* | 3/2010 | Anderson | G06Q 10/10 705/7.29 |
| 2011/0071874 | A1* | 3/2011 | Schneersohn | G06Q 30/02 705/7.32 |
| 2014/0258061 | A1* | 9/2014 | Calman | G06Q 40/00 705/35 |
| 2014/0278655 | A1* | 9/2014 | Sorensen | G06Q 10/063118 705/7.17 |
| 2014/0363059 | A1* | 12/2014 | Hurewitz | G06Q 30/0201 382/118 |
| 2017/0220943 | A1* | 8/2017 | Duncan | G06Q 30/0201 |

* cited by examiner

METHOD AND SYSTEM FOR PREDICTING BEHAVIORAL CHARACTERISTICS OF CUSTOMERS IN PHYSICAL STORES

TECHNICAL FIELD

The presently disclosed embodiments are related, in general, to data processing system. More particularly, the presently disclosed embodiments are related to a method and a system for processing customer data to predict behavioral characteristics of customers in physical stores.

BACKGROUND

In modern days, owing to massive online competition, retail store owners are increasingly interested in the ability to, in the most effective manner, understand the browsing behavior and intentions of consumers inside the physical stores. During a visit to the physical store, such consumers may move around and may (or mayn't) interact with the one or more products. For example, in one scenario, a consumer may interact with multiple products but purchase a very few products from the multiple products. In another scenario, another consumer may spend a significant amount of time in the physical store but may not purchase any product at all. Therefore, it may be necessary for an individual, such as an owner (or an administrator) of the physical store or a service provider, to know about behavioral characteristics of the consumers when they are moving inside the shopping store or interacting with the one or more products in the shopping store.

Currently, various devices, such as aisle-level location tracking device, RFID based asset monitoring device, and/or smart glass-based browsing monitoring device, may facilitate to capture such individual and collective in-store behavior of the customers. However, such devices may require high cost infrastructure support. Further, data captured by such devices may not be useful and efficient enough to determine the behavioral characteristics of the consumers in the physical stores. Therefore, a much more effective and efficient system may be required to determine the behavioral characteristics of the consumers in the physical stores.

Further, limitations and disadvantages of conventional and traditional approaches will become apparent to one of skill in the art, through comparison of described systems with some aspects of the present disclosure, as set forth in the remainder of the present application and with reference to the drawings.

SUMMARY

According to embodiments illustrated herein, there is provided a method for processing customer data to predict behavioral characteristics of a customer in a physical store by a computing server. The method includes receiving, by a transceiver at the computing server, customer data of the customer in the physical store from one or more sensing devices in one or more portable electronic devices associated with the customer. The customer data comprises one or more shopping-related actions, pertaining to a shopping episode, of the customer in the shopping store. The method further includes segmenting, by a processor at the computing server, the shopping episode into one or more segments of time durations based on at least the one or more shopping-related actions of the customer. The method further includes categorizing, by the processor, each of the one or more segments of time durations into one of an in-aisle category and a non-aisle category based on at least an inter-step time duration of the customer during each of the one or more segments of time durations. The method further includes, for each segment of time duration that corresponds to the in-aisle category, identifying, by the processor, one or more hand-related actions of the customer based on the received customer data associated with each segment of time duration. The method further includes, for each segment of time duration that corresponds to the in-aisle category, determining, by the processor, a likelihood of occurrence of an action-related category based on at least the identified one or more hand-related actions. The method further includes, for each segment of time duration that corresponds to the in-aisle category, predicting, by the processor, the behavioral characteristics of the customer based on at least the determined likelihood of occurrence of the action-related category associated with each segment of time duration.

According to embodiments illustrated herein, there is provided a system for processing customer data to predict behavioral characteristics of a customer in a physical store. The system includes a transceiver that is configured to receive customer data of the customer in the physical store from one or more sensing devices in one or more portable electronic devices associated with the customer. The customer data comprises one or more shopping-related actions, pertaining to a shopping episode, of the customer in the physical store. The system further includes a processor that is configured to segment the shopping episode into one or more segments of time durations based on at least the one or more shopping-related actions. The processor is further configured to categorize each of the one or more segments of time durations into one of an in-aisle category and a non-aisle category based on at least an inter-step time duration of the customer during each of the one or more segments of time durations. For each segment of time duration that corresponds to the in-aisle category, the processor is further configured to identify one or more hand-related actions of the customer based on the received customer data associated with each segment of time duration. Further, for each segment of time duration that corresponds to the in-aisle category, the processor is configured to determine a likelihood of occurrence of an action-related category based on at least the identified one or more hand-related actions. Further, for each segment of time duration that corresponds to the in-aisle category, the processor is configured to predict the behavioral characteristics of the customer based on at least the determined likelihood of occurrence of the action-related category associated with each segment of time duration.

According to embodiment illustrated herein, there is provided a computer program product for use with a computer. The computer program product includes a non-transitory computer readable medium. The non-transitory computer readable medium stores a computer program code for processing customer data to predict behavioral characteristics of a customer in a physical store. The computer program code is executable by a transceiver to receive customer data of the customer in the physical store from one or more sensing devices in one or more portable electronic devices associated with the customer. The customer data comprises one or more shopping-related actions, pertaining to a shopping episode, of the customer in the physical store. The computer program code is further executable by a processor to segment the shopping episode into one or more segments of time durations based on at least the one or more shopping-related actions. The computer program code is further executable by the processor to categorize each of the one or more segments of time durations into one of an in-aisle category and a non-aisle category based on at least an inter-step time duration of the customer during each of the one or more segments of time durations. The computer program code is further executable by the processor to identify, for each segment of time duration that corresponds to the in-aisle category, one or more hand-related actions of the customer based on the received customer data associated with each segment of time duration. The computer program code is further executable by the processor to determine, for each segment of time duration that corresponds to the in-aisle category, a likelihood of occurrence of an action-related category based on at least the identified one or more hand-related actions. The computer program code is further executable by the processor to predict, for each segment of time duration that corresponds to the in-aisle category, the behavioral characteristics of the customer based on at least the determined likelihood of occurrence of the action-related category associated with each segment of time duration.

BRIEF DESCRIPTION OF DRAWINGS

The accompanying drawings illustrate the various embodiments of systems, methods, and other aspects of the disclosure. A person having ordinary skill in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

Figure 1:
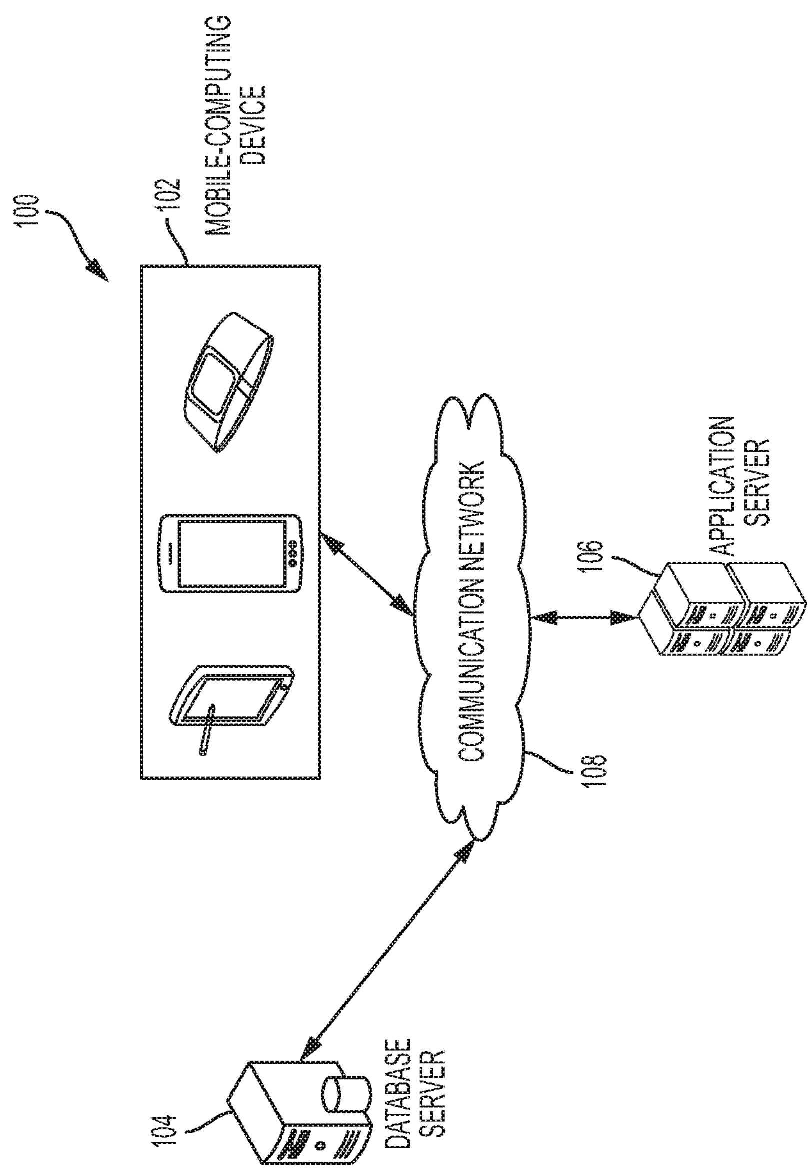
FIG. 1 is a block diagram of a system environment in which various embodiments can be implemented, in accordance with at least one embodiment.

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment," "at least one embodiment," "an embodiment," "one example," "an example," "for example," and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a computer, a device (that includes one or more processors/microcontrollers and/or any other electronic components), or a system (that performs one or more operations according to one or more sets of programming instructions, code, or algorithms) associated with an individual, such as a customer. Examples of the computing device may include, but are not limited to, a desktop computer, a laptop, a personal digital assistant (PDA), a mobile device, a smartphone, a smart watch, a smart band, and a tablet computer (e.g., iPad® and Samsung Galaxy Tab®).

A "sensor" refers to a device that may detect or measure one or more events or changes in quantities and provides a corresponding output, generally as an electrical or optical signal. Such detected or measured signals may be recorded for further analytics. For example, one or more sensors may be utilized to detect or measure a physical movement or a gestural activity of an individual in a shopping store. Further, in an embodiment, the one or more sensors may be embedded inside one or more computing devices, such as a smartphone, a smart watch, and a smart band. Examples of the one or more sensors include, but are not limited to, an accelerometer, a gyroscope, a magnetometer, a step counter, a light sensor, an audio sensor, a heart rate measuring device, and a battery temperature measuring device.

A "physical store" refers to a brick-and-mortar facility where one or more products or services are showcased in shelves to be purchased by one or more individuals. Examples of the physical stores may include departmental stores, grocery stores, shopping malls, and the like. In an embodiment, a physical store may be interchangeably used with a shopping store or a retail store.

A "customer" refers to an individual, who may visit a physical store to purchase one or more products or services. The one or more products or services may be purchased by the customer for self-use or for use by others, according to which the customer may be referred to as direct or indirect customer, respectively. In an embodiment, an end user of the one or more products or services may also correspond to the customer, even though the end user may not have purchased the one or more products or services. Further, the customer may be associated with (and/or may carry) one or more computing devices, such as a smartphone, a smart watch, and a smart band.

"Customer data" refers to data of a customer that may be representative of one or more physical movements or gesture-based activities of the customer in a physical store. In an embodiment, the customer data may be recorded or measured by one or more sensing devices in one or more computing devices associated with the customer.

"Shopping-related actions" refer to one or more activities of a customer in a physical store when the customer is moving in and around the physical store. The one or more activities of the customer may correspond to at least one of: picking up one or more products from one or more locations in the physical store, putting back the picked one or more products to the one or more locations, and putting the picked one or more products in a shopping trolley. Such one or more activities of the customer may be determined based on one or more physical movements or gesture-based activities of the customer captured by one or more sensors in one or more computing devices associated with the customer.

A "behavioral characteristic" of a customer in a physical store refers to a state, knowledge, or experience of the customer during shopping in the physical store. For example, a familiarity or unfamiliarity of the customer with a product may be determined based on at least time taken by the customer to inspect the product, i.e., a time interval between picking the product and putting it into a shopping trolley. In another exemplary scenario, hurriedness of the customer in the physical store may be determined based on at least a number of in-trolley actions and the time spent by the customer in the physical store.

A "shopping episode" refers to a time duration spent by a customer in a physical store. In an embodiment, during a shopping episode, the customer may have purchased one or more products or services from the physical store. In another embodiment, during another shopping episode, the customer may not have purchased the one or more products or services from the physical store.

An "in-aisle" refers to a section (e.g., a passage) in a physical store that includes a space where one or more customers may walk through to select one or more products from one or more shelves associated with the section. Furthermore, an inter-step time duration (i.e., a time duration between two consecutive steps) of a customer is greater in the in-aisle section as compared to a non-aisle section.

A "non-aisle" refers to a section (e.g., a passage) in a physical store that includes a space where one or more customers may walk through but the section is devoid of any product. Furthermore, an inter-step time duration (i.e., a time duration between two consecutive steps) of a customer is lower in the non-aisle section as compared to the in-aisle section.

A "hand-related action" refers to an activity of the customer performed by use of his/her hands. Such hand-related actions are representative of at least an interaction of the customer with one or more products in a physical store. For example, a picking up action is representative of an action when the customer picks up a product from a location in the physical store.

An "action-related category" refers to a type or a class into which one or more hand-related actions of a customer in a physical store may be categorized. In an embodiment, the action-related category may correspond to at least one of a first category, a second category, and a third category. In an embodiment, the first category comprises the one or more hand-related actions of the customer that correspond to at least a picking of one or more products from their corresponding locations in the physical store. In an embodiment, the second category comprises the one or more hand-related actions of the customer that correspond to at least putting back the picked one or more products to their corresponding locations in the physical store. In an embodiment, the third category comprises the one or more hand-related actions of the customer that correspond to at least putting the picked one or more products in a shopping trolley.

A "likelihood of occurrence" refers to a probabilistic determination or estimation of occurrence of an action or an event. In an embodiment, the likelihood of occurrence of an action may be determined based on one or more physical movements or gesture-based activities of an individual in a physical store.

A "user interface (UI)" refers to an interface or a platform that may facilitate an individual, such as a customer, to interact with an associated computing device, such as a computer, a laptop, or smartphone. The individual may utilize various input mechanisms to interact with the UI, such as, but are not limited to, a keypad, mouse, joystick, any touch-sensitive medium (e.g., a touch-screen or touch sensitive pad), voice recognition, gestures, video recognition, and so forth. Hereinafter, the term "UI" is interchangeably referred to as "GUI."

"One or more classifiers" refer to one or more statistical and/or mathematical models that may be configured to classify a segment of time duration into one of the in-aisle category and a non-aisle category. Such classification may be utilized to predict behavioral characteristics of a customer. In an embodiment, prior to the classification, the one or more classifiers may be trained based on ground truth data. The ground truth data pertaining to a shopping episode of one or more customers may be collected by having one or more individuals who act as shadow of the one or more customer (without the customer's knowledge). The one or more individuals may use an application on his/her computing device to record actions of the one or more customers along with time stamps. Examples of the one or more classifiers may include, but are not limited to, a Logistic Regression, a Random Forest (RF) model, a Gaussian Naive Bayes (Gaussian NB), and/or a Bernauli Naive Bayes (Bernauli NB).

FIG. 1 is a block diagram of a system environment in which various embodiments of a method and a system for processing customer data to predict behavioral characteristics of a customer in a physical store may be implemented. With reference to FIG. 1, there is shown a system environment 100 that includes a mobile-computing device 102, a database server 104, and an application server 106. The mobile-computing device 102, the database server 104, and the application server 106 are communicatively coupled with each other over one or more communication networks, such as a communication network 108. For simplicity, FIG. 1 shows one mobile-computing device, such as the mobile-computing device 102, one database server, such as the database server 104, and one application server, such as the application server 106. However, it will be apparent to a person having ordinary skill in the art that the disclosed embodiments may also be implemented using multiple mobile-computing devices, multiple database servers, and multiple application servers, without deviating from the scope of the disclosure.

The mobile-computing device 102 may refer to a computing device (associated with a customer) that may be communicatively coupled to the communication network 108. The mobile-computing device 102 may include one or more processors in communication with one or more memory units. Further, in an embodiment, the one or more processors may be operable to execute one or more sets of computer-readable code, instructions, programs, or algorithms, stored in the one or more memory units, to perform one or more operations. In an embodiment, the mobile-computing device 102 may further include one or more sensing devices that are configured to detect or measure at least the customer data (e.g., one or more physical movements or gesture-based activities) of the customer in the physical store. The one or more sensing devices may correspond to at least one or more of an accelerometer, a gyroscope, a magnetometer, a step counter, a light sensor, an audio sensor, a heart rate measuring device, and a battery temperature measuring device. In an embodiment, the sensing device, such as the accelerometer, may be configured to measure and detect at least speed and patterns of the customer in walking and hand activities in the physical store. In an embodiment, the sensing device, such as the gyroscope, may be configured to measure rotational and angular information of the customer during walking and hand activities in the physical store. In an embodiment, the sensing device, such as the magnetometer, may be configured to measure direction information of the customer during walking in the physical store. In an embodiment, the sensing device, such as the step counter, may be configured to count a number of steps of the customer during walking in the physical store. In an embodiment, the sensing device, such as the light sensor, may be configured to detect ambient light in the physical store. In an embodiment, the sensing device, such as the audio sensor, may be configured to detect ambient noise in the physical store. In an embodiment, the sensing device, such as the heart rate sensor, may be configured to measure and detect heart rate of the customer during walking in the physical store.

Further, in an embodiment, the mobile-computing device 102 may comprise a pre-installed application that may be configured to keep a record of the customer data of the customer in the physical store that has been measured and detected by the one or more sensing devices. In an embodiment, the pre-installed application on the mobile-computing device 102, such as the smartphone, may record the customer data from the one or more sensing devices at a maximum permitted sampling frequency of 200 Hz. In an embodiment, the pre-installed application on the mobile-computing device 102, such as the smart watch, may record the customer data from the one or more sensing devices at a maximum permitted sampling frequency of 25 Hz. Further, the mobile-computing device 102 may transmit the customer data to the application server 106 based on a request received from a computing device, associated with a requestor or a service provider, or a computing server, such as the database server 104 or the application server 106.

The mobile-computing device 102 may further include a display screen that may be configured to display one or more GUIs rendered by a computing server, such as the application server 106. For example, the application server 106 may render a GUI displaying targeted content (e.g., advertisements, offers, discounts, coupons, and/or the like) on the display screen of the mobile-computing device 102 over the communication network 108.

Examples of the mobile-computing device 102 may include, but are not limited to, a personal computer, a laptop, a PDA, a smartphone, a smart watch, a smart band, a tablet, or other such portable computing devices.

The database server 104 may refer to a computing device or a storage device that may be communicatively coupled to the communication network 108. In an embodiment, the database server 104 may be configured to perform one or more database operations. Examples of the one or more database operations may include receiving/transmitting one or more queries, profile data, sensor data, customer data, or content from/to one or more computing devices, such as the mobile-computing device 102, and/or one or more computing servers, such as the application server 106. The one or more database operations may further include processing and storing the one or more queries, profile data, sensor data, customer data, or content. For example, the database server 104 may be configured to store the profile data, received from the mobile-computing device 102, of the customer in the physical store. The database server 104 may be further configured to store the customer data, received from the one or more sensing devices in the mobile-computing device 102, of the customer. The database server 104 may be further configured to store the targeted content (e.g., advertisements, offers, discounts, or coupons) associated with the one or more products or services in the physical store. The database server 104 may be further configured to store pre-defined behavioral characteristics provided by an individual, such as a service provider.

Further, in an embodiment, the database server 104 may store one or more sets of instructions, code, scripts, or programs that may be retrieved by the application server 106 to perform one or more operations. For querying the database server 104, one or more querying languages, such as, but not limited to, SQL, QUEL, and DMX, may be utilized. In an embodiment, the database server 104 may be realized through various technologies such as, but not limited to, Microsoft® SQL Server, Oracle®, IBM DB2®, Microsoft Access®, PostgreSQL®, MySQL® and SQLite®, MongoDB®, and/or the like.

A person having ordinary skill in the art will understand that the scope of the disclosure is not limited to the database server 104 as a separate entity. In an embodiment, the functionalities of the database server 104 may be integrated into the application server 106, or vice-versa, without deviating from the scope of the disclosure.

The application server 106 may refer to a computing device or a software framework hosting an application or a software service that may be communicatively coupled to the communication network 108. In an embodiment, the application server 106 may be implemented to execute procedures such as, but not limited to, the one or more sets of programs, instructions, code, routines, or scripts stored in one or more memory units for supporting the hosted application or the software service. In an embodiment, the hosted application or the software service may be configured to perform the one or more operations of the application server 106.

In an embodiment, the application server 106 may be configured to receive (or extract) the customer data, pertaining to a shopping episode of the customer in the physical store, from the mobile-computing device 102 over the communication network 108. The customer data comprises at least one or more shopping-related actions of the customer in the physical store. The one or more shopping-related actions of the customer may be determined based on the one or more physical movements or gesture-based activities of the customer in the physical store. The one or more physical movements or gesture-based activities of the customer in the physical store are measured, detected, or captured by the one or more sensing devices in the mobile-computing device 102 associated with the customer.

Further, in an embodiment, the application server 106 may be configured to segment the shopping episode of the customer into one or more segments of time durations based on at least the one or more shopping-related actions of the customer in the physical store. The shopping episode may correspond to a total time spent by the customer during a visit to the physical store. Further, in an embodiment, the application server 106 may be configured to categorize each of the one or more segments of time durations into one of an in-aisle category and a non-aisle category. The categorization of each of the one or more segments of time durations is based on at least an inter-step time duration of the customer during each of the one or more segments of time durations. The categorization of each of the one or more segments of time durations has been explained in detail in conjunction with FIG. 3.

Further, in an embodiment, the application server 106 may be configured to determine a time duration of each of the in-aisle category and the non-aisle category based on at least the inter-step time duration of the customer in the physical store. Further, for each segment of time duration that corresponds to the in-aisle category, the application server 106 may be configured to identify one or more hand-related actions of the customer based on the received customer data associated with each segment of time duration. Further, for each segment of time duration that corresponds to the in-aisle category, the application server 106 may be configured to determine a likelihood of occurrence of an action-related category based on at least the identified one or more hand-related actions. The action-related category may correspond to at least one of a first category, a second category, and a third category. The first category comprises the one or more hand-related actions of the customer that correspond to at least picking-up of the one or more products from their corresponding locations in one or more shelves of the physical store. The second category comprises the one or more hand-related actions of the customer that correspond to at least putting back the picked one or more products to their corresponding locations in the one or more shelves of the physical store. The third category comprises the one or more hand-related actions of the customer that correspond to at least putting the picked one or more products in a shopping trolley. The determination of the likelihood of occurrence of the action-related category has been explained in detail in conjunction with FIG. 3.

Further, in an embodiment, the application server 106 may be configured to predict the behavioral characteristics of the customer, for each segment of time duration that corresponds to the in-aisle category, based on at least the determined likelihood of occurrence of the action-related category associated with each segment of time duration. The application server 106 may be further configured to predict the behavioral characteristics of the customer for the entire shopping episode based on at least an aggregation of the predicted behavioral characteristics of the customer during each of the one or more segments of time durations. The application server 106 may be further configured to predict the behavioral characteristics of the customer after a pre-defined time interval based on at least an aggregation of the predicted behavioral characteristics of the customer during each of a plurality of shopping episodes that may have occurred during the pre-defined time interval. Further, in an embodiment, the application server 106 may be configured to recommend the one or more products or services to the customer based on at least the predicted behavioral characteristics of the customer. The application server 106 may be further configured to recommend the targeted content (e.g., advertisements, offers, discounts, or coupons) to the customer based on at least the predicted behavioral characteristics of the customer. In real-time, the application server 106 may recommend a shop assistant to the customer based on at least the predicted behavioral characteristics of the customer. The prediction of the behavioral characteristics of the customer and the recommendation of the one or more products or services have been explained in detail in conjunction with FIG. 3.

The application server 106 may be realized through various types of application servers such as, but not limited to, a Java application server, a .NET framework application server, a Base4 application server, a PHP framework application server, or any other application server framework.

A person having ordinary skill in the art will understand that the scope of the disclosure is not limited to the application server 106 as a separate entity. In an embodiment, the functionalities of the application server 106 may be integrated into a computing device, such as the mobile-computing device 102 or the service provider-computing device (not shown), or vice-versa, without deviating from the scope of the disclosure.

The communication network 108 may include a medium through which devices, such as the mobile-computing device 102 and servers, such as the database server 104 and the application server 106, may communicate with each other. Examples of the communication network 108 may include, but are not limited to, the Internet, a cloud network, a Wireless Fidelity (Wi-Fi) network, a Wireless Local Area Network (WLAN), a Local Area Network (LAN), a wireless personal area network (WPAN), a Wireless Local Area Network (WLAN), a wireless wide area network (WWAN), a cloud network, a Long Term Evolution (LTE) network, a plain old telephone service (POTS), and/or a Metropolitan Area Network (MAN). Various devices in the system environment 100 may be configured to connect to the communication network 108, in accordance with various wired and wireless communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, such as Long Term Evolution (LTE), Light Fidelity (Li-Fi), and/or other cellular communication protocols or Bluetooth (BT) communication protocols.

Figure 2:
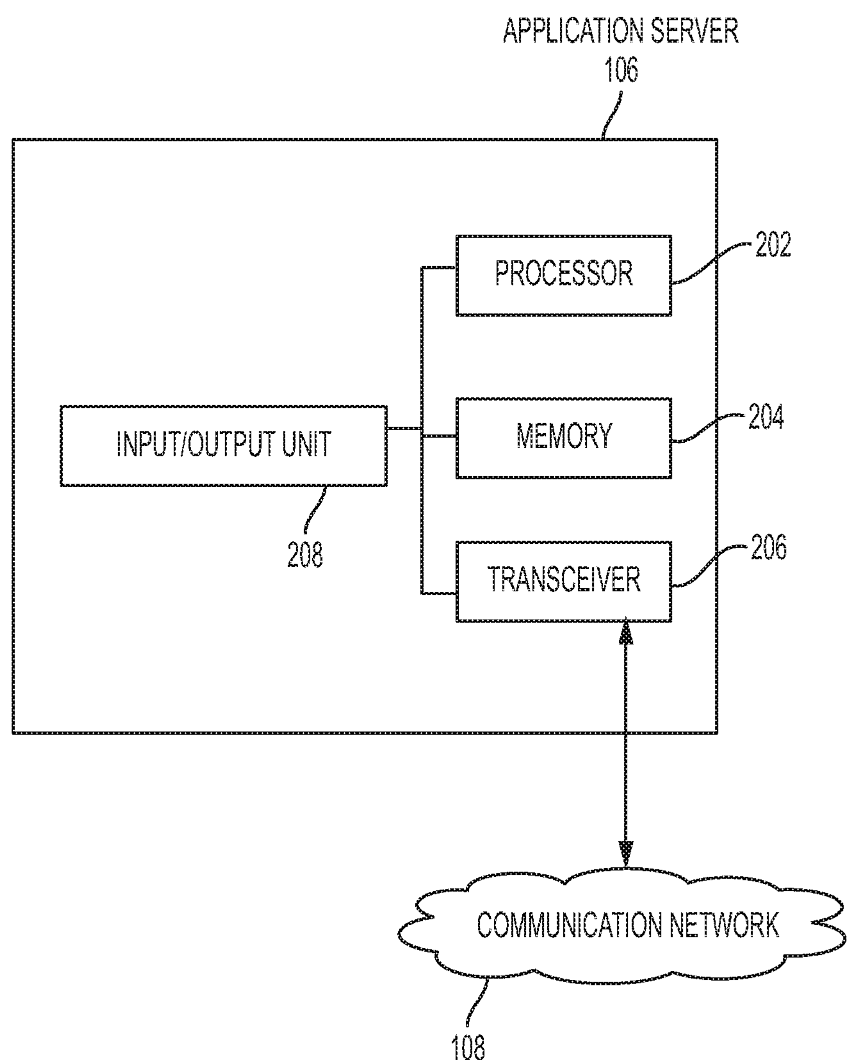
FIG. 2 is a block diagram that illustrates a system for processing customer data to predict behavioral characteristics of a customer in a physical store, in accordance with at least one embodiment.

FIG. 2 is a block diagram that illustrates a system for processing customer data to predict the behavioral characteristics of the customer in the physical store, in accordance with at least one embodiment. With reference to FIG. 2, there is shown a system 200 that may include one or more processors, such as a processor 202, one or more memory units, such as a memory 204, one or more transceivers, such as a transceiver 206, and one or more input/output (I/O) units, such as an I/O unit 208.

The system 200 may correspond to a computing device, such as the mobile-computing device 102, or a computing server, such as the application server 106, without departing from the scope of the disclosure. However, for the purpose of the ongoing description, the system 200 corresponds to the application server 106.

The processor 202 comprises suitable logic, circuitry, interfaces, and/or code that may be configured to execute one or more sets of instructions, programs, or algorithms stored in the memory 204 to perform the one or more operations. For example, the processor 202 may be configured to segment the shopping episode into the one or more segments of time durations. The processor 202 may be further configured to categorize each of the one or more segments of time durations into one of the in-aisle category and the non-aisle category. Further, the processor 202 may be configured to predict the behavioral characteristics of the customer based on the one or more hand-related actions of the customer in the physical store. Further, the processor 202 may recommend the one or more products or services and the targeted content to the customer based on the predicted behavioral characteristics of the customer. In an embodiment, the processor 202 may be communicatively coupled to the memory 204, the transceiver 206, and the I/O unit 208. The processor 202 may be implemented based on a number of processor technologies known in the art. Examples of the processor 202 may include, but not limited to, an X86-based processor, a Reduced Instruction Set Computing (RISC) processor, an Application-Specific Integrated Circuit (ASIC) processor, and a Complex Instruction Set Computing (CISC) processor.

The memory 204 may be operable to store one or more machine code, and/or computer programs having at least one code section executable by the processor 202, the transceiver 206, and/or the I/O unit 208. The memory 204 may store one or more sets of instructions, programs, code, or algorithms that are executed by the processor 202, the transceiver 206, and/or the I/O unit 208 to perform the respective one or more operations. Some of the commonly known memory implementations include, but are not limited to, a random access memory (RAM), a read-only memory (ROM), a hard disk drive (HDD), and a secure digital (SD) card. In an embodiment, the memory 204 may include machine code and/or the one or more computer programs that are executable by the processor 202, the transceiver 206, and/or the I/O unit 208 to perform the one or more specific operations. It will be apparent to a person having ordinary skill in the art that the one or more instructions stored in the memory 204 enables the hardware of the system 200 to perform the one or more operations.

The transceiver 206 comprises suitable logic, circuitry, interfaces, and/or code that may be configured to receive/transmit the one or more queries, sensor data, customer data, content, or other information from/to one or more computing devices (e.g., the mobile-computing device 102, the database server 104, or the application server 106) over the communication network 108. The transceiver 206 may implement one or more known technologies to support wired or wireless communication with the communication network 108. In an embodiment, the transceiver 206 may include circuitry, such as, but not limited to, an antenna, a radio frequency (RF) transceiver, one or more amplifiers, a tuner, one or more oscillators, a digital signal processor, a Universal Serial Bus (USB) device, a coder-decoder (CODEC) chipset, a subscriber identity module (SIM) card, and/or a local buffer. The transceiver 206 may communicate via wireless communication with networks, such as the Internet, an Intranet and/or a wireless network, such as a cellular telephone network, a wireless local area network (LAN) and/or a metropolitan area network (MAN). The wireless communication may use any of a plurality of communication standards, protocols and technologies, such as: Global System for Mobile Communications (GSM), Enhanced Data GSM Environment (EDGE), wideband code division multiple access (W-CDMA), code division multiple access (CDMA), time division multiple access (TDMA), Bluetooth, Light Fidelity (Li-Fi), Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email, instant messaging, and/or Short Message Service (SMS).

The I/O unit 208 comprises suitable logic, circuitry, interfaces, and/or code that may be operable to facilitate the individual, such as a service provider or a requestor, to input one or more pre-defined parameters or constraints. The I/O unit 208 may be operable to communicate with the processor 202, the memory 204, and/or the transceiver 206. Further, in an embodiment, the I/O unit 208, in conjunction with the processor 202 and the transceiver 206, may be operable to provide one or more responses (e.g., the recommendation of the targeted content) in response to the predicted behavioral characteristics. Examples of the input devices may include, but are not limited to, a touch screen, a keyboard, a mouse, a joystick, a microphone, a camera, a motion sensor, a light sensor, and/or a docking station. Examples of the output devices may include, but are not limited to, a speaker system and a display screen.

Figure 3:
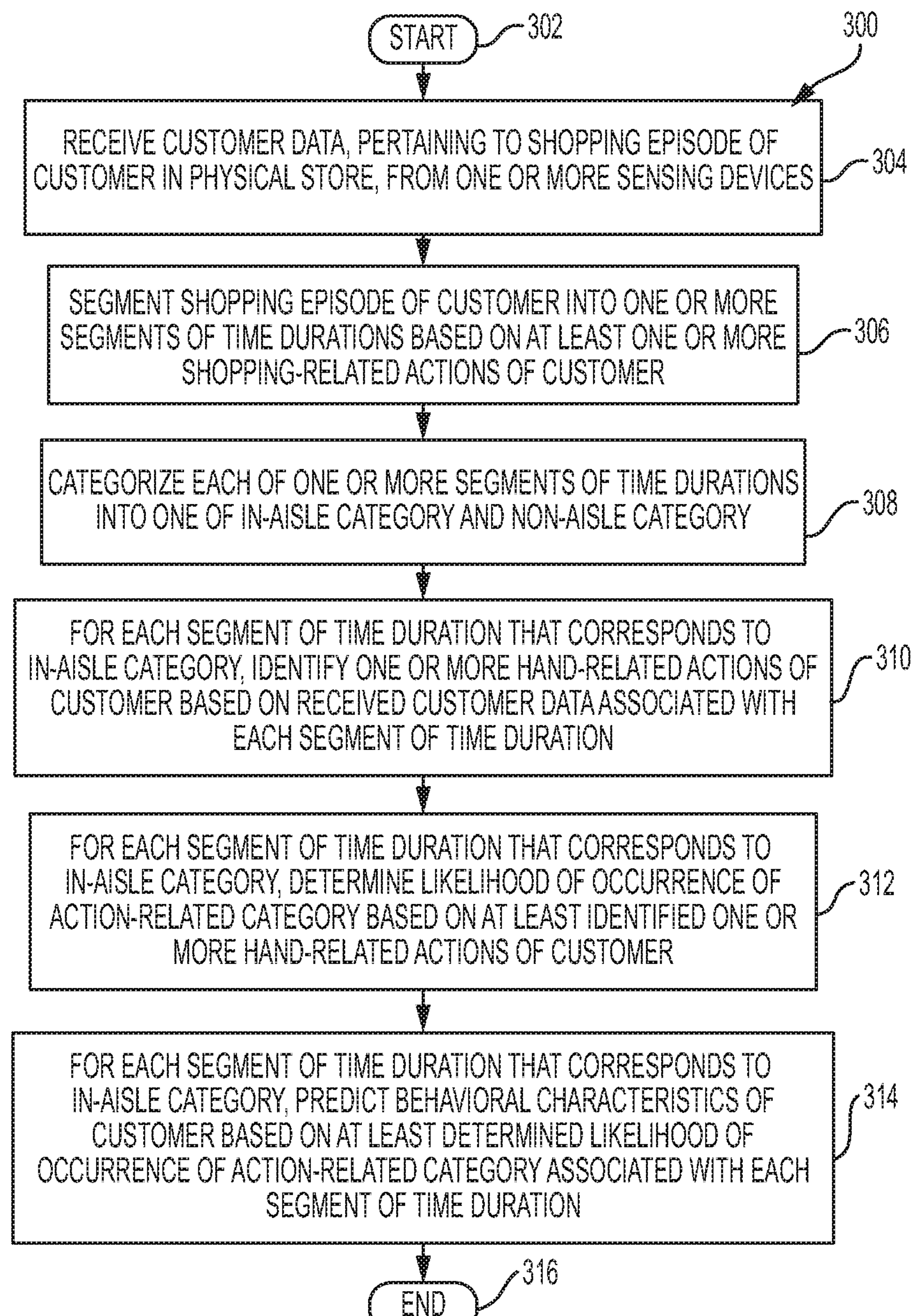
FIG. 3 is a flowchart that illustrates a method for processing customer data to predict behavioral characteristics of a customer in a physical store, in accordance with at least one embodiment.

FIG. 3 is a flowchart that illustrates a method for processing customer data to predict the behavioral characteristics of the customer in the physical store, in accordance with at least one embodiment. With reference to FIG. 3, there is shown a flowchart 300 that is described in conjunction with FIG. 1 and FIG. 2. The method starts at step 302 and proceeds to step 304.

At step 304, the customer data, pertaining to the shopping episode of the customer in the physical store, is received from the one or more sensing devices. In an embodiment, the transceiver 206 may be configured to receive the customer data, pertaining to the shopping episode of the customer in the physical store, from the one or more sensing devices.

Prior to the receipt (or extraction) of the customer data, the customer may visit the physical store to purchase the one or more products or services either for self-use or for use by others. The customer in the physical store may be associated with the one or more portable electronic devices, such as the mobile-computing device 102. The mobile-computing device 102 may correspond to one or more portable devices, such as, but not limited to, the smartphone, the smart watch, and the smart band. Further, the mobile-computing device 102 may comprise the one or more sensing devices, for example, the accelerometer, the gyroscope, the magnetometer, the step counter, the light sensor, the audio sensor, the heart rate measuring device, and the battery temperature measuring device. The one or more sensing devices in the mobile-computing device 102 are configured to measure, detect, or capture the one or more shopping-related actions (i.e., the customer data) pertaining to the shopping episode of the customer in the physical store. The shopping episode may correspond to the total time spent by the customer in the physical store. The customer data of the customer may comprise the one or more physical movements or the gesture-based activities of the customer in the physical store. In an embodiment, the mobile-computing device 102 may be configured to store the customer data, measured, detected, or captured by the one or more sensing devices, in a storage device, such as a memory unit associated with the mobile-computing device 102. In another embodiment, the pre-installed application in the mobile-computing device 102 may be configured to keep the record of the customer data of the customer that has been measured, detected, or captured by the one or more sensing devices.

Further, in an embodiment, the mobile-computing device 102 may receive the request for the customer data from the processor 202 over the communication network 108. Based on the received request, the mobile-computing device 102 may transmit the customer data of the customer to the processor 202. The processor 202, in conjunction with the transceiver 206, may receive the customer data of the customer from the mobile-computing device 102. In another embodiment, the processor 202, in conjunction with the transceiver 206, may transmit a query to the mobile-computing device 102 to extract the customer data of the customer. Further, in an embodiment, the processor 202, in conjunction with the transceiver 206, may store the received (or extracted) customer data pertaining to the shopping episode of the customer in the storage unit, such as the memory 204 or the database server 104.

At step 306, the shopping episode of the customer is segmented into the one or more segments of time durations based on at least the one or more shopping-related actions of the customer. In an embodiment, the processor 202 may be configured to segment the shopping episode of the customer into the one or more segments of time durations based on at least the one or more shopping-related actions of the customer.

Prior to the segmenting of the shopping episode, the processor 202 may be configured to retrieve the stored customer data that constitutes the one or more shopping-related actions of the customer from the memory 204 or the database server 104. In an embodiment, the processor 202 may be configured to identify each of the one or more shopping-related actions of the customer from the customer data based on at least an interaction of the customer with the one or more products or services in the physical store. Further, the processor 202 may be configured to identify each of the one or more shopping-related actions of the customer based on at least the one or more locations of the customer in the physical store. Further, the processor 202 may be configured to identify each of the one or more shopping-related actions of the customer based on at least the speed and walking pattern of the customer in the physical store. For example, the customer is walking slowly (or at a faster speed) in and around the physical store. In another example, the customer is moving his/her hand to pick a product from the one or more shelves in the physical store, to inspect the picked product and thereafter, to put the picked product back to the one or more shelves or into the shopping trolley. Such data associated with the movement of the product, captured by the one or more sensing devices, may be utilized by the processor 202 to identify the one or more shopping-related actions of the customer in the physical store.

In another embodiment, the processor 202 may utilize a trained classifier (e.g., a supervised classifier) to identify each of the one or more shopping-related actions of the customer during the shopping episode of the customer in the physical store. The classifier may be trained by use of sensor data, such as speed data, rotational data, angular data, directional data, and/or the like, that may define the one or more shopping-related actions of an individual in a shopping store.

After identifying each of the one or more shopping-related actions of the customer, the processor 202 may be configured to segregate the shopping episode of the customer into the one or more segments of time durations. For example, a segment of time duration may correspond to a time duration during which the customer is in motion (e.g., walking). Another segment of time duration may correspond to a time duration during which the customer is interacting with a product in the physical store. Another segment of time duration may correspond to a time duration during which the customer is communicating with another individual in the physical store. After segmenting the shopping episode of the customer into the one or more segments of time durations, the one or more segments of time durations are categorized into one of the in-aisle category and the non-aisle category that has been discussed in conjunction with step 308.

At step 308, each of the one or more segments of time durations is categorized into one of the in-aisle category and the non-aisle category. In an embodiment, the processor 202 may be configured to categorize each of the one or more segments of time durations into one of the in-aisle category and the non-aisle category. In an embodiment, the in-aisle category may correspond to a category that is representative of a section (e.g., a passage) in the physical store where the customer may walk through to select the one or more products or services from the one or more shelves associated with the section. In an embodiment, the non-aisle category may correspond to a category that is representative of a section (e.g., a passage) in the physical store where the customer may walk through but may not be able to select the one or more products or services as the section does not include the one or more shelves comprising the one or more products or services.

In an embodiment, the processor 202 may be configured to categorize each of the one or more segments of time durations into one of the in-aisle category and the non-aisle category based on at least one or more rules defined by the service provider or the requestor. In an exemplary scenario, a first rule for categorizing the one or more segments of time durations into one of the in-aisle category and the non-aisle category may be based on at least walking speed of the customer in the physical store. The walking speed of the customer in each of the one or more segments of time durations may be determined based on the inter-step time duration of the customer in each of the one or more segments of time durations. The inter-step time duration of the customer may correspond to a time duration between two consecutive steps of the customer. In an embodiment, the inter-step time duration of the customer is higher in the in-aisle category as compared to the non-aisle category. In an exemplary scenario, a segment of time duration may be categorized into the in-aisle category if the walking speed of the customer is below a threshold value else the segment of time duration is categorized into the non-aisle category. In one embodiment, the threshold value may be provided by the service provider or the requestor. In another embodiment, the processor 202 may determine the threshold value based on at least historical data corresponding to the walking speed of the customer in one or more physical stores. In another exemplary scenario, the processor 202 may categorize each of the one or more segments of time durations into one of the in-aisle category and the non-aisle category based on a second rule. The second rule is based on a criteria where the customer mostly pushes the shopping trolley (or carries a basket or a bag) in the non-aisle category, however there may be substantial variations in hand movements due to the interaction of the customer with the one or more products or services in the in-aisle category.

Further, in an embodiment, the processor 202 may be configured to generate a first graphical distribution of the shopping episode based on the inter-step time duration of the customer in the physical store. The first graphical distribution may comprise one or more peaks that are associated with one or more peak-point values and one or more foots that are associated with one or more foot-point values. In an embodiment, the in-aisle category may begin from a foot to a peak in the first graphical distribution. Similarly, the non-aisle category may begin from a foot to a peak in the first graphical distribution. The processor 202 may utilize a peak and valley detection technique, known in the art, to identify the one or more peak-point values ($t_{peak_i}$) and the one or more foot-point values ($t_{foot_i}$) for all ramps in the first graphical distribution. The processor 202 may be further configured to perform a change point detection analysis using a classifier, such as a binary random forest classifier, that is trained to identify the in-aisle category and the non-aisle category in the shopping episode. For example, the processor 202 may obtain features (that may be determined based on the customer data comprising the sensor data) within a window corresponding to a first ramp, $w=[t_{foot_1}, t_{peak_1}]$, and thereafter, the processor 202 may compute a classification probability "Pr(aisle|featureset(w))" using the binary random forest classifier. Thereafter, the processor 202 may be configured to increase the window size to include subsequent peaks, one peak at a time, until the classification probability drops. In a scenario where the accuracy dropped for the window, $w=[t_{foot_i}, t_{peak_i}]$, the window, $w=[t_{foot_i}, t_{peak_{i-1}}]$, is categorized as the in-aisle category. Similarly, the features in the window, $w=[t_{peak(i-1)}, t_{foot_i}]$, may be used to compute a classification probability "Pr(nonaisle|featureset(w))" and the window size is incremented to include subsequent foots until the classification probability drops, say at $t_{foot_k}$, then the window, $w=[t_{peak_{(i-1)}}, t_{foot_{(k-1)}}]$, is categorized as the non-aisle category. In an exemplary scenario, the processor 202 may utilize the features, as given in the following Table 1, to categorize each of the one or more segments of time durations into one of the in-aisle category and the non-aisle category.

TABLE 1

Exemplary features for In-aisle and Non-aisle categorization

| Feature | Usage Status for In-aisle vs. Non-aisle Categorization |
|---|---|
| Mean phone accelerometer magnitude | Yes |
| Spectral entropy of phone accelerometer magnitude | Yes |
| Mean watch accelerometer across x, y, z axes | Yes (only y, z axes) |
| Spectral entropy of Watch accelerometer across x, y, z axes | Yes (only y, z axes) |
| Mean watch gyroscope along x, y, z axes | Yes (only a axis) |
| Variance in step rate | Yes |

After identifying one or more in-aisle categories and one or more non-aisle categories, the processor 202 may be configured to determine a time duration of each of the one or more in-aisle categories and the one or more non-aisle categories. In an embodiment, the processor 202 may determine the time duration of each of the one or more in-aisle categories and one or more non-aisle categories based on the one or more peak-point values and the one or more foot-point values associated with each of the one or more in-aisle categories and one or more non-aisle categories. The identification of the one or more in-aisle categories and the one or more non-aisle categories and the determination of the corresponding time duration have been explained with an illustrative first graphical distribution in conjunction with FIG. 4A.

At step 310, for each segment of time duration that corresponds to the in-aisle category, the one or more hand-related actions of the customer are identified based on the received customer data associated with each segment of time duration. In an embodiment, the processor 202 may be configured to identify, for each segment of time duration that corresponds to the in-aisle category, the one or more hand-related actions of the customer based on the received customer data associated with each segment of time duration. The processor 202 may process the customer data, for example, received from the one or more sensing devices, such as the gyroscope sensor in the smart watch of the customer, to identify the one or more hand-related actions of the customer. The processor 202 may extract the gyroscope data from the received customer data. Thereafter, the processor 202 may generate a second graphical distribution of the extracted gyroscope data, after performing quaternion rotation with respect to a common origin, and fitting it to a curve, such as a spline curve. The value plotted in the second graphical distribution is the normalized product of pitch, roll and yaw. The processor 202 may identify an action corresponding to a peak-point in the graphical distribution as a hand action, with negligible false negatives, but there may be a significant number of false positives, resulting from arbitrary hand movements. To address this, the processor 202 may be configured to run a peak detection algorithm to identify one or more peak-points in the second graphical distribution. Thereafter, the processor 202 may eliminate the false positives by filtering out the one or more peak-points that are associated with the non-aisle category. For each remaining peak-point in the second graphical distribution, the processor 202 may be configured to compute the features (determined based on the customer data comprising the sensor data) in the window corresponding to the width of the peak-point (i.e., full-width at half-maximum). Thereafter, the processor 202 may provide the computed features as input to the binary random forest classifier to compute the probability that the action is the hand action based on a combination of watch gyroscope, watch accelerometer and phone accelerometer features. In an exemplary scenario, the processor 202 may utilize the features, as given in following Table 2, to identify the one or more hand-related actions of the customer. Further, the identification of the one or more hand-related actions has been explained with an illustrative second graphical distribution in conjunction with FIG. 4B.

TABLE 2

Exemplary features to identify hand-related actions

| Feature | Usage Status for Hand vs. Non-Hand-Related Actions |
|---|---|
| Mean phone accelerometer magnitude | Yes |
| Spectral entropy of phone accelerometer magnitude | Yes |
| Mean watch accelerometer across x, y, z axes | Yes (only y, z axes) |
| Spectral entropy of Watch accelerometer across x, y, z axes | Yes (only y, z axes) |
| Mean watch gyroscope along x, y, z axes | Yes (only a axis) |
| Spectral entropy of watch gyroscope along x, y, z axes | Yes |

At step 312, for each segment of time duration that corresponds to the in-aisle category, the likelihood of occurrence of the action-related category is determined based on at least the identified one or more hand-related actions of the customer. In an embodiment, the processor 202 may be configured to determine, for each segment of time duration that corresponds to the in-aisle category, the likelihood of occurrence of the action-related category based on at least the identified one or more hand-related actions of the customer that corresponds to each segment of time duration. In an embodiment, the action-related category may correspond to at least one of the first category, the second category, and the third category. The first category comprises the one or more hand-related actions of the customer that correspond to at least picking-up of the one or more products from their corresponding locations in the one or more shelves of the physical store. The second category comprises the one or more hand-related actions of the customer that correspond to at least putting back the picked one or more products to their corresponding locations in the one or more shelves of the physical store. The third category comprises the one or more hand-related actions of the customer that correspond to at least putting the picked one or more products in the shopping trolley.

In an embodiment, the processor 202 may determine the likelihood of occurrence of one of the first category, the second category, and the third category using a Viterbi decoding approach on Hidden Markov Model (HMM), known in the art. The processor 202 may determine state transition probabilities between the first category, the second category, and the third category based on a pre-defined set of data. The emission probability is defined as Pr(FS|l), where “l” corresponds to the first category, the second category, and the third category, and “FS” corresponds to a set of features measured, detected, or captured by the one or more sensing devices, such as the smart watch gyroscope and the smart watch accelerometer. The set of features comprises at least a mean watch accelerometer across x,y,z axes, a spectral entropy of watch accelerometer across x,y,z axes, a mean watch gyroscope along x,y,z axes, and a spectral entropy of watch gyroscope along x,y,z axes, which are observations for the HMM. The emission probability may be obtained by use of following equation (denoted by equation-1):

$$Pr(FS \mid l) = \frac{Pr(l \mid FS) * Pr(FS)}{Pr(l)} \tag{1}$$

where, $$Pr(FS) = \Pi_{i=1}^{n} Pr(f_i) \tag{2}$$

The probabilities $Pr(f_i)$ and Pr(l) may be obtained from distribution of the empirical data. The probability Pr(l|FS) is obtained from a random forest ternary classifier, which is trained to distinguish between the first category, the second category, and the third category using the features in FS.

At step 314, for each segment of time duration that corresponds to the in-aisle category, the behavioral characteristics of the customer is predicted based on at least determined likelihood of occurrence of the action-related category associated with each segment of time duration. The behavioral characteristics of the customer may correspond to a state, knowledge, sentiment, or experience of the customer during shopping in the physical store. In an embodiment, the processor 202 may be configured to predict, for each segment of time duration that corresponds to the in-aisle category, the behavioral characteristics of the customer. In an embodiment, the processor 202 may predict the behavioral characteristics of the customer based on at least the determined likelihood of occurrence of the action-related category associated with each segment of time duration. Further, in an embodiment, the processor 202 may predict the behavioral characteristics of the customer based on at least the time taken by the customer to inspect or check the one or more products during each action-related category or between two action related categories. For example, based on the sensor data received from the one or more sensing devices, the processor 202 determines that an action of the customer corresponds to the first category, i.e., the customer has picked up a product from a location of a shelves in the physical store. Further, the processor 202 determines that the customer observes or inspects the picked product for “5 minutes,” and then put back the picked product to its corresponding location in the shelf. In such a case, the processor 202 may predict the behavioral characteristic of the customer as “unfamiliar.” Similarly, based on the sensor data received from the one or more sensing devices, the processor 202 determines that the customer has picked up multiple products of same type. However, the customer has put back most of the picked products back to their corresponding location and eventually put the remaining few products into the shopping trolley. In such a scenario, the processor 202 may predict the behavioral characteristic of the customer as “no a prior brand affinity but instead compared multiple brands before few specific products.” In another illustrative example, based on the heart rate data, if the processor 202 determines that the heart rate of the customer increases above a defined heart rate limit when the customer picks up and inspects a product, then the processor 202 may predict the behavioral characteristic of the customer as “surprised, unexpected, and shocked.”

In another embodiment, the processor 202 may be configured to predict the behavioral characteristics of the customer for the entire shopping episode based on at least an aggregation of the predicted behavioral characteristics of the customer during each of the one or more segments of time durations. For example, if the processor 202 determines a relatively small number of in-trolley actions, and shorter duration in the non-aisle category, then in such a case, the processor 202 may predict the behavioral characteristic of the customer for the entire shopping episode as “customer was in a hurry.” Further, such insights may also describe about the various properties of the physical store itself. For example, based on unusual slow movement of the customer in the non-aisle segments of the physical store, the processor 202 may predict that the physical store was “overcrowded.” In another example, the processor 202 determines that the customer is moving from one in-aisle segment to another in-aisle segment in the physical store, however, the customer is not able to select any product. In such a case, the processor 202 may predict the behavioral characteristic of the customer as “customer in a hurry and confused over a range of products. May need assistance.”

Further, in an embodiment, the processor 202 may be configured to predict the behavioral characteristics of the customer after a pre-defined time interval that includes at least a plurality of shopping episodes of the customer. The processor 202 may predict the behavioral characteristics of the customer after the pre-defined time interval based on at least an aggregation of the predicted behavioral characteristics of the customer during each of the plurality of shopping episodes. In an embodiment, the plurality of shopping episodes may be associated with one or more physical stores over the pre-defined time interval, for example, over a period of weeks, months, years, and so on. In an embodiment, the behavioral characteristics of the customer in the physical store over the pre-defined time interval may be representative of the customer’s persona. For example, the processor 202 may predict the customer’s persona as “customer is always hurried during a weekday visit” or “customer always shop in bulk.”

In an embodiment, based on at least the predicted behavioral characteristics of the customer, the processor 202 may be configured to recommend the targeted content to the customer. The targeted content may include one or more offers, discounts, advertisements, and/or promos about the one or more products or services associated with the one or more physical store. The predicted behavioral characteristics may be associated with at least one of the one or more segments of time durations, the shopping episode, and/or the pre-defined time interval comprising the plurality of shopping episodes. Further, in an embodiment, the processor 202 may render a user interface displaying the targeted content on the display screen of the mobile-computing device 102.

Further, in an embodiment, based on at least the predicted behavioral characteristics of the customer, the processor 202 may be configured to recommend the shop assistant to the customer in the physical store based on at least the processing of the customer in real-time. The shop assistant may correspond to an individual associated with the physical store, who may assist the one or more customers in the physical store with respect to the purchasing of the one or more products or services from the physical store. The predicted behavioral characteristics may be associated with at least one of the one or more segments of time durations, the shopping episode, and/or the pre-defined time interval comprising the plurality of shopping episodes. Control passes to the end step 316.

Figure 4A:
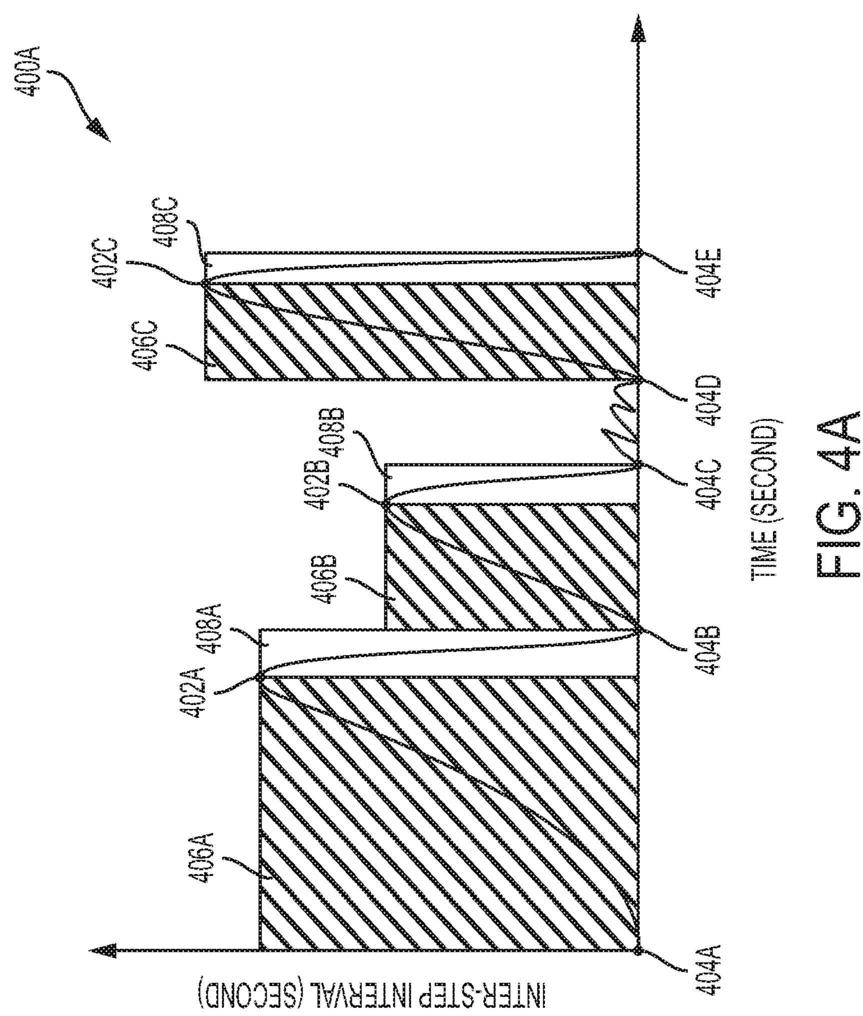
FIG. 4A is an illustrative graphical distribution for identifying an in-aisle category and a non-aisle category, in accordance with at least one embodiment.

FIG. 4A is an illustrative graphical distribution for identifying the in-aisle category and the non-aisle category, in accordance with at least one embodiment. With reference to FIG. 4A, there is a shown a first graphical distribution 400A that is described in conjunction with FIG. 1, FIG. 2, and FIG. 3.

In an embodiment, the processor 202 may generate the first graphical distribution 400A based on the inter-step time duration of the customer in the physical store, as discussed above in the step 308 in conjunction with FIG. 3. The first graphical distribution 400A comprises the one or more peaks (denoted by 402A, 402B, and 402C) that are associated with the one or more peak-point values. The first graphical distribution 400A further comprises the one or more foots (denoted by 404A, 404B, 404C, 404D, and 404E) that are associated with the one or more foot-point values. The in-aisle category begins from a foot to a peak in the first graphical distribution. For example, one or more in-aisle categories in the first graphical distribution 400A may correspond to one or more first regions (denoted by 406A, 406B, and 406C). Similarly, the non-aisle category may begin from a foot to a peak in the first graphical distribution. For example, one or more non-aisle categories in the first graphical distribution 400A may correspond to one or more second regions (denoted by 408A, 408B, and 404C).

Figure 4B:
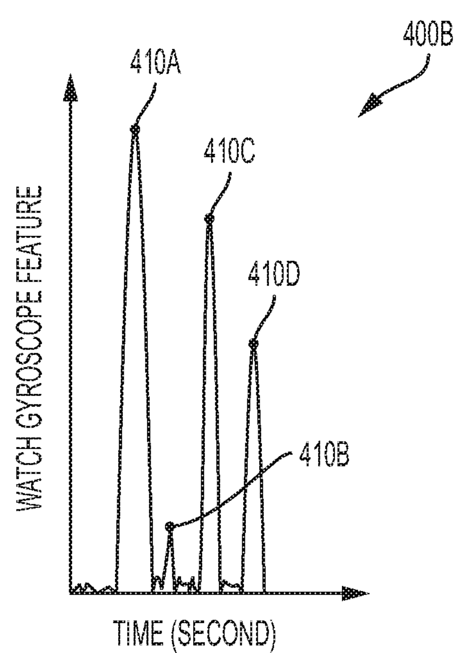
FIG. 4B is an illustrative graphical distribution for identifying one or more hand-related actions of a customer in a physical store, in accordance with at least one embodiment.

FIG. 4B is an illustrative graphical distribution for identifying the one or more hand-related actions of the customer, in accordance with at least one embodiment. With reference to FIG. 4B, there is a shown a second graphical distribution 400B that is described in conjunction with FIG. 1, FIG. 2, and FIG. 3.

In an embodiment, the processor 202 may generate the second graphical distribution 400B based on the customer data (e.g., accelerometer sensor data and gyroscope sensor data) pertaining to the shopping episode of the customer in the physical store, as discussed above in the step 310 in conjunction with FIG. 3. The one or more hand-related actions may correspond to the one or more peak-points (denoted by 410A, 410B, 410C, and 410D) in the second graphical distribution 400B.

Figure 5:
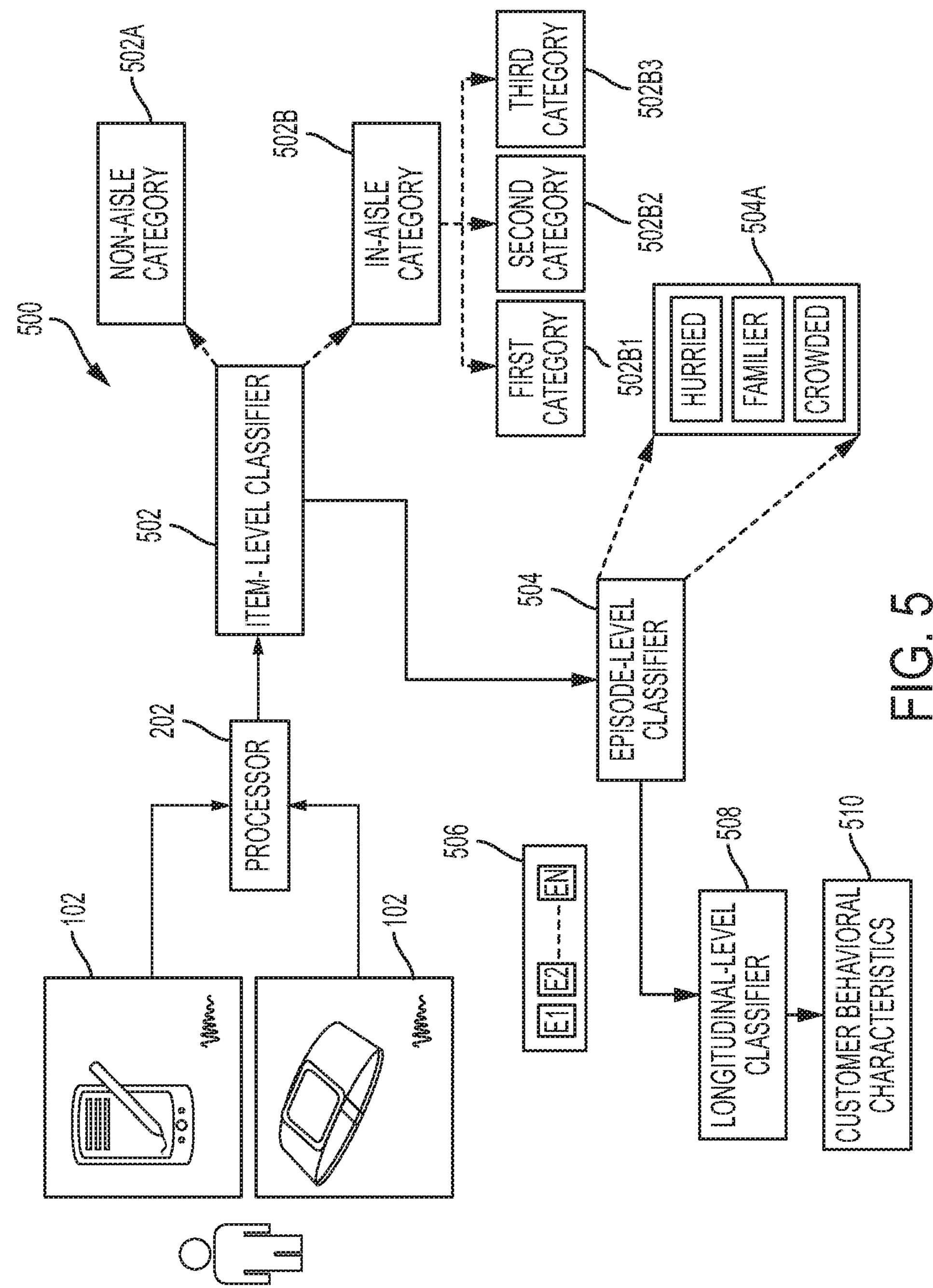
FIG. 5 is a block diagram that illustrates is a flow diagram of processing the customer data to predict behavioral characteristics of a customer in a physical store, in accordance with at least one embodiment.

FIG. 5 is a flow diagram that illustrates the method for processing the customer data to predict the behavioral characteristics of the customer in the physical store, in accordance with at least one embodiment. With reference to FIG. 5, there is shown a flow diagram 500 that is described in conjunction with FIG. 1, FIG. 2, and FIG. 3.

The processor 202 may receive or extract the customer data of the customer in the physical store from the one or more sensing devices in the mobile-computing device 102 (e.g., the smartphone, the smart watch, and the smart band). The customer data may comprise the one or more physical movements or gesture-based activities of the customer in the physical store. Such one or more physical movements or gesture-based activities may be measured, detected, or captured by the one or more sensing devices. Further, the customer data may be received or extracted in real time and/or non-real time. Thereafter, the processor 202 may be configured to segment the shopping episode of the customer in the physical store into the one or more segments of time durations. Each of the one or more segments of time durations may correspond to a single physical movement or gesture-based activity of the customer in the physical store. Thereafter, the processor 202 may transmit each segment of time duration to a hierarchical "item-level" classifier (denoted by 502), which is configured to classify each segment of time duration into one of the in-aisle category (denoted by 502B) and the non-aisle category (denoted by 502A). The hierarchical "item-level" classifier (denoted by 502) may be trained on ground truth data to classify each segment of time duration into one of the in-aisle category (denoted by 502B) and the non-aisle category (denoted by 502A). Further, the hierarchical "item-level" classifier (denoted by 502) may classify the customer data, associated with each segment of time duration that correspond to the in-aisle category, into one of the first category (denoted by 502B1), the second category (denoted by 502B2), and the third category (denoted by 502B3). Further, in an embodiment, the collection of the one or more physical movements or gesture-based activities (from the hierarchical "item-level" classifier (denoted by 502)) is collectively analyzed by an "episode-level" classifier (denoted by 504) to discern episode-level behavioral characteristics (denoted by 504A) of the customer, for example, "the customer was in a hurry?," "the customer was familiar with products?," or "the store was overcrowded?." Further, the multiple shopping episodes (denoted by 506) of the same customer are fed as an input to a "longitudinal-level" classifier (denoted by 508) to discern longitudinal-level behavioral characteristics (denoted by 510) of the customer, for example, "the customer is always hurried during weekday visit to the store."

The disclosed embodiments encompass numerous advantages. The disclosure provides a method for processing the customer data to predict behavioral characteristics of the customer in the physical store. The customer data comprises the physical movements or gesture-based activities of the customer in the physical store. Using a combination of the one or more portable electronic devices (e.g., a smart phone and a smart watch), carried by the customer in the physical stores, the disclosed system gathers the customer's data and thereafter, analyses the customer's behavior inside the physical store. The disclosed method may classify different facets of the customer's interaction or experience with the one or more products or services, as well as attributes of the overall shopping episode in the physical store. In addition to defining individual product interactions, the disclosed system breakdown the entire customer's journey into aisle segments containing the product interactions and non-aisle activity. The determination of such behavioral characteristics of the customer in the physical store may be further utilized for recommending the targeted content to the customer and providing an assistance to the customer in the physical store.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for processing customer data to predict behavioral characteristics of customers in physical stores by a computing server. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person having ordinary skill in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method comprising:

detecting, using one or more sensing devices provided in one or more portable electronic devices carried by a customer, behavior data relating to a behavior of a customer when the customer is shopping in a physical store, the behavior data comprising one or more shopping-related actions in a shopping episode;

receiving, by a transceiver at a computing server, the behavior data from the one or more portable electronic devices;

identifying, by a processor of the one or more portable electronic devices, the one or more shopping-related actions based on at least one of an interaction of the customer with one or more products or services in the physical store, a location of the customer in the physical store, and a speed or walking pattern of the customer in the physical store;

segmenting, by a processor of the computing server, said shopping episode into one or more segments of time durations based on said one or more shopping-related actions;

categorizing, by said processor, each of said one or more segments of time durations into one of an in-aisle category and a non-aisle category based on at least an inter-step time duration of said customer during each of said one or more segments of time durations, wherein categorizing comprises:

generating a first graphic distribution of the shopping episode based on the inter-step time duration;

identifying one or more peak-point values of one or more peaks and one or more foot-point values of one or more foots in the first graphic distribution using a peak and valley detection algorithm; and performing a change point detection analysis using a classifier to identify the in-aisle category and the non-aisle category, the change point detection analysis being based on a change to a classification probability as a size of a window including at least one peak or at least one valleys changes in the first graphic distribution; and for each segment of time duration that corresponds to said in-aisle category:

identifying, by said processor, one or more hand-related actions of said customer based on said received behavior data associated with said each segment of time duration, wherein identifying the hand-related actions comprises:

generating a second graphic distribution based on gyroscope data extracted from the behavior data;

identifying a peak in the second graphical distribution;

computing features in a window corresponding to a width of the peak at half-maximum; and computing a probability that an action is a hand action based on a combination of the gyroscope data and accelerometer data retrieved from the behavior data;

determining, by said processor, a likelihood of occurrence of an action-related category based on at least said identified one or more hand-related actions, wherein determining the likelihood of occurrence comprises:

determining a probability based on a set of features detected by the one or more sending devices and included in the behavior data, the set of features comprising at least one parameter of a gyroscope extracted from the gyroscope data and at least one parameter of an accelerometer extracted from the accelerometer data;

predicting, by said processor, behavioral characteristics of said customer based on at least said determined likelihood of occurrence of said action-related category associated with said each segment of time duration; and rendering, by the processor, a user interface on a screen of the one or more portable electronic devices carried by the customer to display a targeted content to the customer, the targeted content being determined based on the predicted behavioral characteristics of the customer and comprising at least one of an offer, a discount, an advertisement, and a promotion about the one or more products or services associated with the physical store.

2. The method of claim 1, wherein said behavior data comprises at least movement and gesture data of said customer during said shopping episode, wherein said shopping episode corresponds to a time duration spent by said customer in said physical store.

3. The method of claim 1, wherein said one or more portable electronic devices correspond to at least one of a smartphone, a smart watch, and a smart band, and wherein said one or more sensing devices in said one or more portable electronic devices correspond to at least one or more of an accelerometer, a gyroscope, a magnetometer, a step counter, a light sensor, an audio sensor, a heart rate measuring device, and a battery temperature measuring device.

4. The method of claim 1, wherein each of said one or more segments of time durations corresponds to at least one movement or gesture activity of said customer in said physical store.

5. The method of claim 1, wherein a time duration of each of said in-aisle category and said non-aisle category is determined, by said processor, based on said one or more peak-point values and said one or more foot-point values associated with each of said one or more segments of time durations.

6. The method of claim 1, wherein said action-related category corresponds to at least one of a first category, a second category, and a third category.

7. The method of claim 6, wherein said first category comprises said one or more hand-related actions of said customer that correspond to at least a picking of one or more products from their corresponding locations in said physical store.

8. The method of claim 7, wherein said second category comprises said one or more hand-related actions of said customer that correspond to at least putting back said picked one or more products to their corresponding locations in said physical store.

9. The method of claim 7, wherein said third category comprises said one or more hand-related actions of said customer that correspond to at least putting said picked one or more products in a shopping trolley.

10. The method of claim 1, wherein said behavioral characteristics of said customer correspond to at least a familiarity state or a knowledge state of said customer about one or more products or services based on at least time taken by said customer to check said one or more products when picked by said customer.

11. The method of claim 1 further comprising predicting, by said processor, said behavioral characteristics of said customer during said shopping episode based on at least an aggregation of said predicted behavioral characteristics of said customer during each of said one or more segments of time durations.

12. The method of claim 1 further comprising predicting, by said processor, said behavioral characteristics of said customer after a pre-defined time interval based on at least an aggregation of said predicted behavioral characteristics of said customer during each of a plurality of shopping episodes that corresponds to said pre-defined time interval, and wherein each of said plurality of shopping episodes is associated with one or more physical stores.

13. The method of claim 1, wherein said predicted behavioral characteristics correspond to at least one of said one or more segments of time durations, said shopping episode, and a pre-defined time interval comprising a plurality of shopping episodes.

14. The method of claim 1 further comprising recommending, by said processor, a shop assistant to said customer based on at least said predicted behavioral characteristics of said customer, wherein said predicted behavioral characteristics correspond to at least one of said one or more segments of time durations, said shopping episode, and a pre-defined time interval comprising a plurality of shopping episodes.

15. A system comprising:

a mobile application installable on one or more portable electronic devices carried by a customer, the mobile application configured to collect behavior data sensed by one or more sensing devices provided with the one or more portable electronic devices when the customer is shopping in a physical store, the behavior data comprising one or more shopping-related actions in a shopping episode;

a transceiver configured to receive said behavior data from the one or more portable electronic devices; and a processor configured to:

identify the one or more shopping-related actions based on at least one of an interaction of the customer with one or more products or services in the physical store, a location of the customer in the physical store, and a speed or walking pattern of the customer in the physical store;

segment said shopping episode into one or more segments of time durations based on said one or more shopping-related actions;

categorize each of said one or more segments of time durations into one of an in-aisle category and a non-aisle category based on at least an inter-step time duration of said customer during each of said one or more segments of time durations, wherein categorizing comprises:

generating a first graphic distribution of the shopping episode based on the inter-step time duration;

identifying one or more peak-point values of one or more peaks and one or more foot-point values of one or more foots in the first graphic distribution using a peak and valley detection algorithm; and performing a change point detection analysis using a classifier to identify the in-aisle category and the non-aisle category, the change point detection analysis being based on a change to a classification probability as a size of a window including at least one peak or at least one valleys changes in the first graphic distribution; and for each segment of time duration that corresponds to said in-aisle category:

identify one or more hand-related actions of said customer based on said received behavior data associated with said each segment of time duration, wherein identifying the hand-related actions comprises:

generating a second graphic distribution based on gyroscope data extracted from the behavior data;

identifying a peak in the second graphical distribution;

computing features in a window corresponding to a width of the peak at half-maximum; and computing a probability that an action is a hand action based on a combination of the gyroscope data and accelerometer data retrieved from the behavior data;

determine a likelihood of occurrence of an action-related category based on at least said identified one or more hand-related actions, wherein determining the likelihood of occurrence comprises:

determining a probability based on a set of features detected by the one or more sending devices and included in the behavior data, the set of features comprising at least one parameter of a gyroscope extracted from the gyroscope data and at least one parameter of an accelerometer extracted from the accelerometer data;

predict said behavioral characteristics of said customer based on at least said determined likelihood of occurrence of said action-related category associated with said each segment of time duration; and render a user interface in the mobile application displayed on a screen of the one or more portable electronic devices carried by the customer to display a targeted content to the customer, the targeted content being determined based on the predicted behavioral characteristics of the customer and comprising at least one of an offer, a discount, an advertisement, and a promotion about the one or more products or services associated with the physical store.

16. The system of claim 15, wherein said behavior data comprises at least movement and gesture data of said customer during said shopping episode, wherein said shopping episode corresponds to a time duration spent by said customer in said physical store.

17. The system of claim 15, wherein said one or more portable electronic devices correspond to at least one of a smartphone, a smart watch, and a smart band, and wherein said one or more sensing devices in said one or more portable electronic devices correspond to at least one or more of an accelerometer, a gyroscope, a magnetometer, a step counter, a light sensor, an audio sensor, a heart rate measuring device, and a battery temperature measuring device.

18. The system of claim 15, wherein each of said one or more segments of time durations corresponds to at least one movement or gesture activity of said customer in said physical store.

19. The system of claim 15, wherein said processor is further configured to determine a time duration of each of said in-aisle category and said non-aisle category based on said one or more peak-point values and said one or more foot-point values associated with each of said one or more segments of time durations.

20. The system of claim 15, wherein said action-related category corresponds to at least one of a first category, a second category, and a third category.

21. The system of claim 20, wherein said first category comprises said one or more hand-related actions of said customer that correspond to at least a picking of one or more products from their corresponding locations in said physical store.

22. The system of claim 21, wherein said second category comprises said one or more hand-related actions of said customer that correspond to at least putting back said picked one or more products to their corresponding locations in said physical store.

23. The system of claim 21, wherein said third category comprises said one or more hand-related actions of said customer that correspond to at least putting said picked one or more products in a shopping trolley.

24. The system of claim 15, wherein said behavioral characteristics of said customer correspond to at least a familiarity state or a knowledge state of said customer about one or more products or services based on at least time taken by said customer to check said one or more products when picked by said customer.

25. The system of claim 15, wherein said processor is further configured to predict said behavioral characteristics of said customer during said shopping episode based on at least an aggregation of said predicted behavioral characteristics of said customer during each of said one or more segments of time durations.

26. The system of claim 15, wherein said processor is further configured to predict said behavioral characteristics of said customer after a pre-defined time interval based on at least an aggregation of said predicted behavioral characteristics of said customer during each of a plurality of shopping episodes that corresponds to said pre-defined time interval, and wherein each of said plurality of shopping episodes is associated with one or more physical stores.

27. The system of claim 15, wherein said predicted behavioral characteristics correspond to at least one of said one or more segments of time durations, said shopping episode, and a pre-defined time interval comprising a plurality of shopping episodes.

28. The system of claim 15, wherein said processor is further configured to recommend a shop assistant to said customer based on at least said predicted behavioral characteristics of said customer, wherein said predicted behavioral characteristics correspond to at least one of said one or more segments of time durations, said shopping episode, and a pre-defined time interval comprising a plurality of shopping episodes.

29. A computer program product for use with a computing device, the computer program product comprising a non-transitory computer readable medium, wherein the non-transitory computer readable medium stores a computer program code executable by one or more processors in the computing device to:

detect, using one or more sensing devices provided in one or more portable electronic devices carried by a customer, behavior data relating to a behavior of a customer when the customer is shopping in a physical store, the behavior data comprising one or more shopping-related actions in a shopping episode;

receive said behavior data from the one or more portable electronic devices;

identify the one or more shopping-related actions based on at least one of an interaction of the customer with one or more products or services in the physical store, a location of the customer in the physical store, and a speed or walking pattern of the customer in the physical store;

segment said shopping episode into one or more segments of time durations based on said one or more shopping-related actions;

categorize each of said one or more segments of time durations into one of an in-aisle category and a non-aisle category based on at least an inter-step time duration of said customer during each of said one or more segments of time durations, wherein categorizing comprises:

generating a first graphic distribution of the shopping episode based on the inter-step time duration;

identifying one or more peak-point values of one or more peaks and one or more foot-point values of one or more foots in the first graphic distribution using a peak and valley detection algorithm; and performing a change point detection analysis using a classifier to identify the in-aisle category and the non-aisle category, the change point detection analysis being based on a change to a classification probability as a size of a window including at least one peak or at least one valleys changes in the first graphic distribution; and for each segment of time duration that corresponds to said in-aisle category:

identify one or more hand-related actions of said customer based on said received behavior data associated with said each segment of time duration, wherein identifying the hand-related actions comprises:

generating a second graphic distribution based on gyroscope data extracted from the behavior data; and identifying a peak in the second graphical distribution;

computing features in a window corresponding to a width of the peak at half-maximum; and computing a probability that an action is a hand action based on a combination of the gyroscope data and accelerometer data retrieved from the behavior data;

determine a likelihood of occurrence of an action-related category based on at least said identified one or more hand-related actions, wherein determining the likelihood of occurrence comprises:

determining a probability based on a set of features detected by the one or more sending devices and included in the behavior data, the set of features comprising at least one parameter of a gyroscope extracted from the gyroscope data and at least one parameter of an accelerometer extracted from the accelerometer data; and predict behavioral characteristics of said customer based on at least said determined likelihood of occurrence of said action-related category associated with said each segment of time duration; and render a user interface on a screen of the one or more portable electronic devices carried by the customer to display a targeted content to the customer, the targeted content being determined based on the predicted behavioral characteristics of the customer and comprising at least one of an offer, a discount, an advertisement, and a promotion about the one or more products or services associated with the physical store.

* * * * *